Patented July 22, 1930

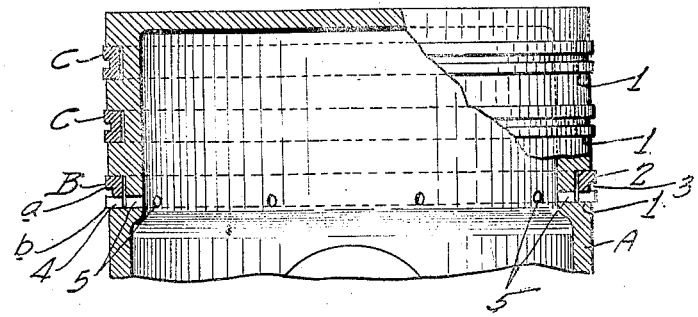
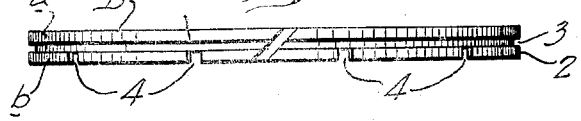
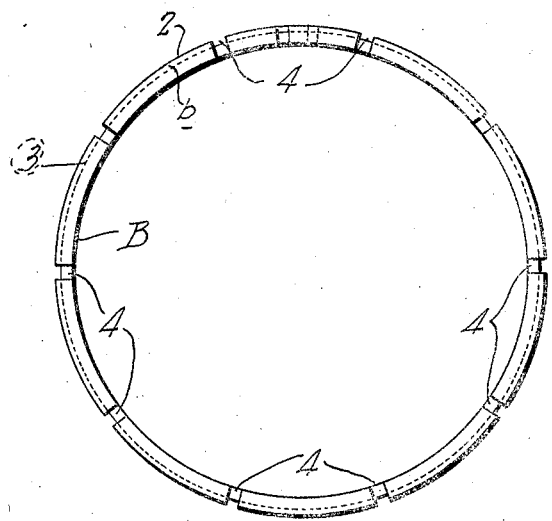

1,771,198

UNITED STATES PATENT OFFICE

FRANK H. WALTER, OF ST. LOUIS, MISSOURI, ASSIGNOR TO UNICO MOTOR PRODUCTS CORPORATION, OF ST. LOUIS, MISSOURI, A CORPORATION OF MISSOURI

PISTON RING

Application filed March 28, 1929. Serial No. 350,695.

This invention relates to a certain new and useful improvement in piston rings of the type especially adapted for use in internal combustion engines.

In internal combustion engines having a splash system of lubrication, such as are today generally employed in automobiles and the like, lubricant is distributed upon the cylinder-walls at timed intervals in more or less excessive quantities varying in volume, and it is hence essential that means be provided to prevent any excess lubricant working up the cylinder walls into the explosion-chambers of the engine, the presence of lubricating oil in the explosion-chambers, as is well known, more or less detrimentally in various way affecting the efficiency of the engine.

My present invention has for its chief object the provision of means in the form of a piston ring so constructed as to efficiently function not only in forming a fluid-tight joint between the piston and the cylinder, but also in removing from the cylinder-wall and directing back into the crank-case of the engine any excess lubricant.

With the above and other objects in view, my present invention resides in the novel features of form, construction, arrangement, and combination of parts hereinafter described and pointed out in the claims.

In the accompanying drawings,—

Figure 1 illustrates fragmentally a piston equipped with a ring embodying my invention, both piston and ring being shown partly in elevation and partly in section;

Figure 2 is an elevational view of the ring; and

Figure 3 is a plan view of the ring.

Referring now more in detail and by reference characters to the drawing, which illustrates a preferred embodiment of my invention, A designates a piston of any standard or approved form, provided, as is usual, with a plurality of suitably spaced circumferential grooves 1. Disposed around the piston A and preferably only in the inner or lower groove 1, is a ring B of my invention, the other grooves 1 accommodating rings C of any desired type.

The ring B is preferably of substantially rectangular section, as best seen in Figure 1, and of the split resilient type with preferably a step-joint to bear expansively, as is common, at its outer peripheral face 2 upon the inner wall of the engine-cylinder to form a fluid-tight joint, in the reciprocations of the piston, between the piston and the wall of the cylinder.

Provided circumferentially in the ring, medially its opposite ends, is a groove 3, whereby the peripheral face 2 is divided into cylinder-wall engaging portions a and b.

Provided in and upon the one or lower end face, and opening to both the outer and inner peripheral faces, of the ring, as well as also communicating with the circumferential groove 3, is a series of suitably spaced transverse or radial slots or passages 4.

Formed in the piston at the base of the said inner or lower groove 1 and communicating both with the groove 1 and the interior of the piston, are ducts or passages 5.

As so constructed and disposed, the ring is adapted at its peripheral faces a and b to scrape the cylinder-wall in the reciprocations of the piston, surplus or excess lubricant finding escape or discharging into the crank-case of the engine either directly, or indirectly by way of the main groove 3, through the slots 4 and ducts 5.

Thus the ring is adapted to readily provide for so-called oil-relief. The ring is simple and inexpensive in construction, may be readily fitted upon the piston, and is efficient in the performance of its intended functions.

I am aware that changes in the form and construction of the ring may be made and substituted for those herein shown and described without departing from the nature and principle of my invention.

Having thus described my invention, what I claim and desire to secure by Letters Patent is:

1. A piston ring having a circumferential groove in its outer peripheral face intermediate its opposite end faces and provided in an end-face with a series of spaced radial slots, each of said slots communicating with said groove and opening at its ends to the outer and inner peripheral faces of the ring.

2. A piston ring having an outer peripheral face divided by a circumferential groove into a plurality of cylinder-wall engaging portions, the ring being provided in an end face with a series of spaced radial slots, each of said slots opening at its inner end to the inner peripheral face of the ring and at its outer end opening through one of said cylinder-wall engaging portions to the outer face of the ring and communicating with said groove.

3. A piston ring having an outer peripheral face divided by a circumferential groove disposed midway the opposite end faces of the ring into a pair of cylinder-wall engaging portions, the ring being provided in an end face with a series of spaced radial slots, each of said slots opening at its inner end to the inner peripheral face of the ring and at its outer end opening through one of said cylinder-wall engaging portions to the outer face of the ring and communicating with said groove.

In testimony whereof, I have signed my name to this specification.

FRANK H. WALTER.